United States Patent [19]
Spande

[11] Patent Number: 5,847,880
[45] Date of Patent: Dec. 8, 1998

[54] 60 DEGREE FIELD OF VIEW EYEPIECE

[75] Inventor: Robert A. Spande, Alexandria, Va.

[73] Assignee: The United States of America as represented by the Secretary of the Army, Washington, D.C.

[21] Appl. No.: 890,316

[22] Filed: Jul. 9, 1997

[51] Int. Cl.⁶ .................................................. G02B 25/00
[52] U.S. Cl. .......................................... 359/643; 359/644
[58] Field of Search ..................... 359/643, 644, 359/645, 646, 647

[56] References Cited

U.S. PATENT DOCUMENTS 5,680,249  10/1997  Ishikawa et al. ....................... 359/643

*Primary Examiner*—Scott J. Sugarman
*Attorney, Agent, or Firm*—Milton W. Lee; John E. Holford; Alain L. Bashore

[57] ABSTRACT

An optical eyepiece assembly for providing a sixty degree field of view capability to an image intensifier. The assembly includes first and second air-spaced lens doublets, a first lens, filter element, and second lens.

1 Claim, 2 Drawing Sheets

60 DEGREE FIELD OF VIEW EYEPIECE

DESCRIPTION

Background of the Invention

1. Field of the Invention

The present invention generally relates to eyepieces and more specifically, to an image intensifier eyepiece with a sixty degree field of view.

2. Description of Prior Art

The eyepiece is a critical optical element to the practical usability of an overall image intensifier optical system. In optical design, eyepieces are defined by an external stop (entrance pupil diameter) placed at the eye relief distance. Eye relief distance is the distance between the eye's cornea and eye lens vertex, where an observer views the entire field. The maximum distance is defined as "eye relief". While the prior art is replete with eyepiece designs, eyepieces with wide fields of view are difficult to design.

New wide field of view designs are needed because of difficulties in the prior. Large stop diameters result in designs too large to be compatible for using these eyepieces on a binocular fielded for human interpupillary distances. Aberrations also occur if a large stop is used. Eye relief must also be reduced in an eyepiece design since in many applications of optical design there must be usage in tight confinements (such as using with a gas mask).

While the prior art has reported using eyepiece designs none have established a basis for a specific solution that is dedicated to the task of resolving the particular problem at hand. What is needed in this instance is a wide field of view eyepiece design for an image intensifier that has a large stop diameter and short eye relief.

SUMMARY OF THE INVENTION

It is therefore one object of the invention to provide a wide field of view eyepiece design for an image intensifier that has a large stop diameter and short eye relief.

According to the invention, there is disclosed an optical eyepiece assembly for providing a sixty degree field of view capability to an image intensifier. A first air-spaced lens doublet positioned on the optical axis after an aperture stop accepts incoming light and provides eye relief distance. A second air-spaced lens doublet positioned after the first air-spaced lens doublet provides optical magnification. A first lens positioned after the second air-spaced lens doublet flattens the output from the second air-spaced lens doublet. A filter element positioned after the first lens on the optical axis provides spectrum filtering output from the first lens. A second lens positioned after the filter element on the optical axis also flattens output from the filter element which is input through an input substrate of an image intensifier whereby a 60 degree field of view is effected with reduced eye relief distance and increased stop diameter.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The human eye can be considered as a gimbaled sensor that has a narrow high resolution over approximately one degree field. In order to see larger field of view, the eye rotates. The eye's entrance pupil is located 3 mm behind the eye's vertex. Center of rotation is 10 mm behind the entrance pupil and thus 13 mm behind the cornea's vertex. The technique of the present invention utilizes defining optical rays at eye point or center of rotation of eye. This technique will allow for diffraction vision of all field points. In addition to looking directly at the ray bundle for axial, and upper and lower fields, two additional eye positions are included. The first eye position is when the eye is looking up and rays are coming from an axial field point, the second is when rays are coming from upper field point and the eye is looking at lower field point.

Figure 1:
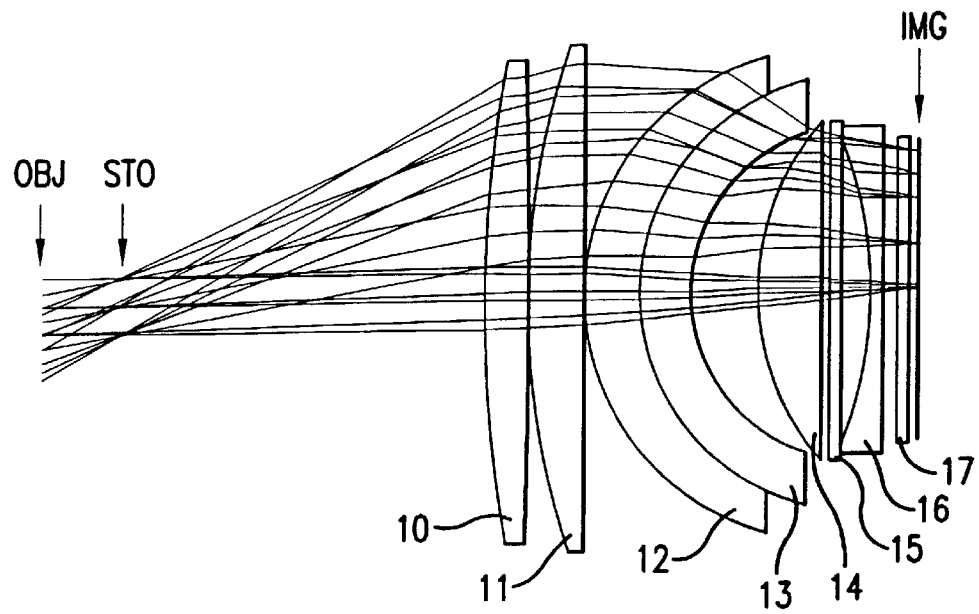
FIG. 1 is a side view of the optical assembly layout with superimposed optical ray trace.

Referring now to the drawings, and more particularly to FIG. 1, there is shown a side view of the optical assembly layout with superimposed optical ray trace. Light from a target at the object plane (OBJ) passes through a stop field (STO) to continue as input into the optical assembly shown in FIG. 1. Elements 10 and 11 are air spaced doublets which provide long eye relief distance. The back surface of element 11 is flat with a diffractive surface. Elements 12 and 13 are also air spaced doublets which in conjunction with elements 10 and 11, all substantially provide for the optical magnification of the assembly. Elements 14 and 16 are field flattening negative lens which give a good image quality. Element 15 is an optical filter for filtering spectral qualities from the optical path. Element 17 is the input substrate to an image intensifier.

The optical prescription for the optical assembly of FIG. 1 is shown in TABLE 1:

TABLE 1

| ELEMENT NO. | THICKNESS | RADIUS | GLASS | CCY | THC | GLC |
|---|---|---|---|---|---|---|
| OBJ | INFINITY | INFINITY | | 100 | 100 | |
| STO | INFINITY | 13.000000 | | 100 | 100 | |
| | INFINITY | 20.000000 | | 100 | 100 | |
| 10 | 112.00000 | 3.902088 | LAH58 OHARA | 100 | 0 | |
| | −382.3 1514 | 0. 100000 | AIR | 0 | 0 | |
| 11 | 71.56953 | 4.846698 | LAH58 OHARA | 0 | 0 | |
| | INFINITY | 0. 100000 | | 100 | 0 | |
| | HOE: | | | | | |

HVI: REA    HV2: REA    HOR: 1
HXI:O.OOOOOOE+00 HTI:O. OOOOOOE+00 HZI:-. 100000E+05
CXI:    100    CYI:    100    CZI:    100

TABLE 1-continued

| ELEMENT NO. | THICKNESS | RADIUS | GLASS | CCY | THC | GLC |
|---|---|---|---|---|---|---|
| HX2:0.000000E+00 HY2:0.000000E+00 HZ2:-.100000E+05 | | | | | | |
| CX2: 100 CY2: 100 CZ2: 100 | | | | | | |
| HWL: 544.50 HTO: SPH HCT: R | | | | | | |
| HCO/HCC | | | | | | |
| CI :-1.1181E-03 C2:-4.4702E-07 C3:-1.2903E-09 | | | | | | |
| CI: 100 C2: 100 C3: 0 | | | | | | |
| C4:2.9495E-12 C5: -2.5227E-15 | | | | | | |
| C4: 0 CS: 0 | | | | | | |
| 12 | 22.29757 | 5.009801 | SFL56 SCHOTT | 0 | 0 | |
| | 19.72702 | 0.100000 | | 0 | 0 | |
| 13 | 19.70683 | 5.013146 | LAH58_OHARA | 0 | 0 | |
| | 16.10248 | 5.556827 | | 0 | 0 | |
| 14 | 23.49775 | 5.663095 | LAH58_OHARA | 0 | 0 | |
| | 4411.58832 | 0.624693 | | 0 | 0 | |
| 15 | INFINITY | 1.209000 | 'y52' | 100 | 100 | |
| | INFINITY | 2.368767 | | 100 | 0 | |
| 16 | -41.07790 | 0.958226 | SFL6_SCHOTT | 0 | 0 | |
| | 876.26750 | 1.365593 | | 0 | 0 | |
| 17 | INFINITY | 1.194000 | 533000.613000 | 100 | 100 | 100 |
| | INFINITY | 0.648972 | | 100 | 0 | |
| IMG | INFINITY | 0.000000 | | 100 | 100 | |

Glass materials utilized for the lens elements are also described in TABLE 1 by glass code (known in the art) and indices of refraction, but each lens element may be made of other materials that are functionally equivalent. Specification data is shown in TABLE 2:

TABLE 2

| EPD | 5.00000 | | | | | |
|---|---|---|---|---|---|---|
| DIM | MM | | | | | |
| WL | 558.00 | 553.50 | | 549.00 | 544.50 | 540.00 |
| REF | 4 | | | | | |
| WTW | 2 | 3 | 39 | 98 | 2 | |
| XAN | 0.00000 | 0.00000 | 0.00000 | 0.00000 | 0.00000 | 0.00000 |
| YAN | 0.00000 | 7.00000 | 14.00000 | 21.00000 | 25.00000 | 30.0000 |
| VUX | 0.00000 | 0.00000 | 0.00000 | 0.00000 | 0.00000 | 0.00000 |
| VLX | 0.00000 | 0.00000 | 0.00000 | 0.00000 | 0.00000 | 0.00000 |
| VUY | 0.00000 | 0.00000 | 0.00000 | 0.00000 | 0.00000 | 0.90000 |
| VLY | 0.00000 | 0.00000 | 0.00000 | 0.00000 | 0.00000 | 0.00000 |

Aperture data and edge definitions are given in Table 3:

TABLE 3

| CIR S3 | 20.275705 |
|---|---|
| CIR S4 | 20.528013 |
| CIR S5 | 21.629650 |
| CIR S6 | 21.607660 |
| CIR S7 | 20.248165 |
| CIR S8 | 17.807341 |
| CIR S9 | 17.794596 |
| CIR S10 | 14.877330 |
| CIR S11 | 14.890063 |
| CIR S12 | 14.760382 |
| CIR S13 | 14.278655 |
| CIR S14 | 13.744184 |
| CIR S15 | 13.742817 |
| CIR S16 | 13.243679 |

TABLE 4 lists the infinite conjugates resulting from the invention:

TABLE 4

| E1L | 23.9897 |
|---|---|
| BFL | 0.7088 |
| FFL | 7.3021 |
| FNO | 4.7979 |
| IMG DIS | 0.6490 |
| OAL | 71.0119 |
| PARABAL IMAGE | |
| FIr | 13.8505 |
| ANG | 30.0000 |
| ENTRANCE PUPIL | |
| DIA | 5.0000 |
| | 0.0000 |
| EXiT PUPIL | |
| DIA | 16.4265 |
| THI | 79.5221 |

TABLE 5 lists the centered tolerances of the invention:

TABLE 5

| SUR | RADIUS | RADIUS TOL | FRINGES POW/IRR | THICKNESS | TOL | THICKNESS GLASS TeL | INDEX (%) | V-NO |
|---|---|---|---|---|---|---|---|---|
| 1 | | | 20 | | 0.5 | | | |
| 2 | | | 13 | | 0.5 | | | |
| 3 | 112 | .1 | 12/3.0 | 3.90209 | 0.5 | LAH58 | 0.002 | 0.8 |
| 4 | −382.:31514 | 35 | 12/3.0 | 0.1 | 0.5 | AIR | | |
| 5 | 71.56653 | 1.1 | 12/3.0 | 4.89467 | 0.5 | LAH58 | 0.002 | 0.8 |
| 6 | INF | | 12/3.0 | 0.1 | 0.5 | | | |
| 7 | 22.29757 | 0.04 | 12/3.0 | 5.0098 | 0.6 | SFL56 | 0.002 | 0.8 |
| 8 | 19.72702 | 0.04 | 12/3.0 | 0.1 | 0.5 | | | |
| 9 | 19.70683 | 0.04 | 12/3.0 | 5.01315 | 0.6 | LAH58 | 0.002 | 0.8 |
| 10 | 16.10248 | 0.04 | 12/3.0 | 5.5683 | 0.5 | | | |
| 11 | 23.49775 | 0.25 | 12/3.0 | 5.66309 | 0.5 | LAH58 | 0.002 | 0.8 |
| 12 | 4411.58832 | 880 | 12/3.0 | 0.62469 | | | | |
| 13 | INF | | 12/3.0 | 1.209 | 0.5 | 'Y52' | 0.002 | 0.8 |
| 14 | INF | | 12/3.0 | 2.36877 | | | | |
| 15 | −41.0779 | 0.7 | 12/3.0 | 0.95823 | 0.5 | | | |
| 16 | 876.2675 | 180 | 12/3.0 | 1.36559 | 0.5 | SFL6 | 0.002 | 0.8 |
| 17 | INF | | 12/3.0 | 1.194 | 0.5 | | | |
| 18 | INF | | 12/3.0 | 0.64897 | 0.5 | 53000.61300 | 0.002 | 0.8 |
| 19 | 0.0341 | | | 0.0341 | 0.5 | | | |

TABLE 6 lists the decentred tolerances of the invention:

TABLE 6

| ELEMENT NO. | FRONT RADIUS | BACK RADIUS | ELEMENT TIR | WEDGE ARC MIN | ELEMENT | TILT TIR | ARC | EL DEC/ROLL(R) MINTIR | mm |
|---|---|---|---|---|---|---|---|---|---|
| 1 | 112 | −38231514 | | 0.1 | 8.5 | 0.1014 | 8.6 | 0.1878 | 0.4 |
| 2 | 71.56*53 | INF | 0.18 | | 0.108 | 8.6 | 0.0804 | 0.1 | |
| 3 | 22.29757 | 19.72702 | | 0.02 | 1.9 | 0.089 | 8.6 | 0.0022 | 0.2 |
| 4 | 19.7*683 | 16.10248 | 0.02 | 2.3 | 0.(1*5 | 6.9 | 0.001 | 70.04 | |
| 5 | 23.49775 | 4411.58832 | 0.06 | 7 | 0.02*5 | 3.4 | 0.(1*4 | 0.04 | |
| 6 | INF | INF | | | 0.1 | 12.5 | 0.1374 | 17.2 | |
| 7 | −41.0779 | 876.2675 | | 0.06 | 7.8 | 0.053 | 6.9 | 0.085* | 0.08 |
| 8 | INF | INF | | | 0.1 | 13.5 | 0.1273 | 17.2 | |

Figure 2:
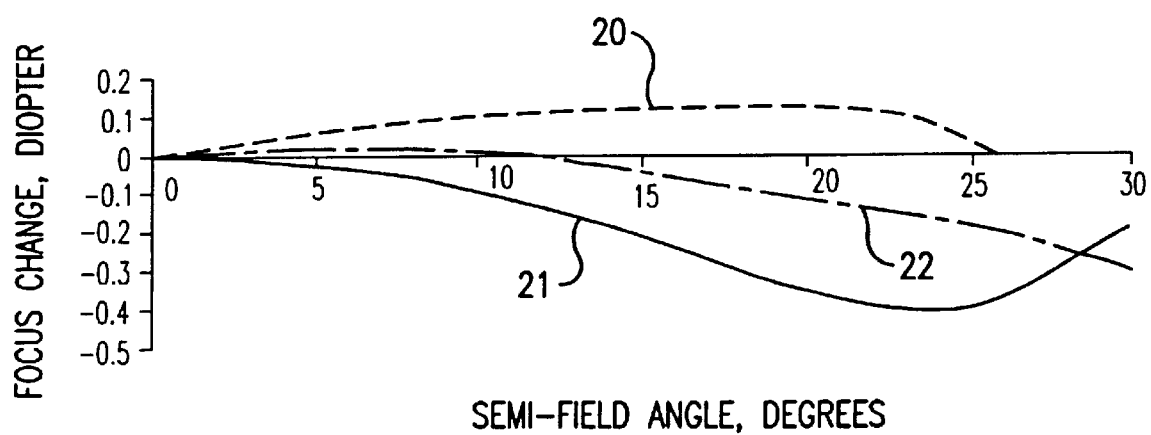
FIG. 2 is a graph of curvature and astigmatism for the optical assembly of FIG. 1.

FIG. 2 is a graph of focus change for the optical assembly of FIG. 1. A sharp focus is desired in an optical system but especially in complex systems there is a problem with astigmatism which gives rise to blurred images at the margins. Line 20 is the tangential astigmatic field curve while line 21 is the radial component of the astigmatic field curve. Line 22 is the average of lines 20 and 21. As shown in FIG. 2, astigmatism does not approach a "greater than minimum" out of focus range beyond approximately 15 degrees field of view.

Figure 3:
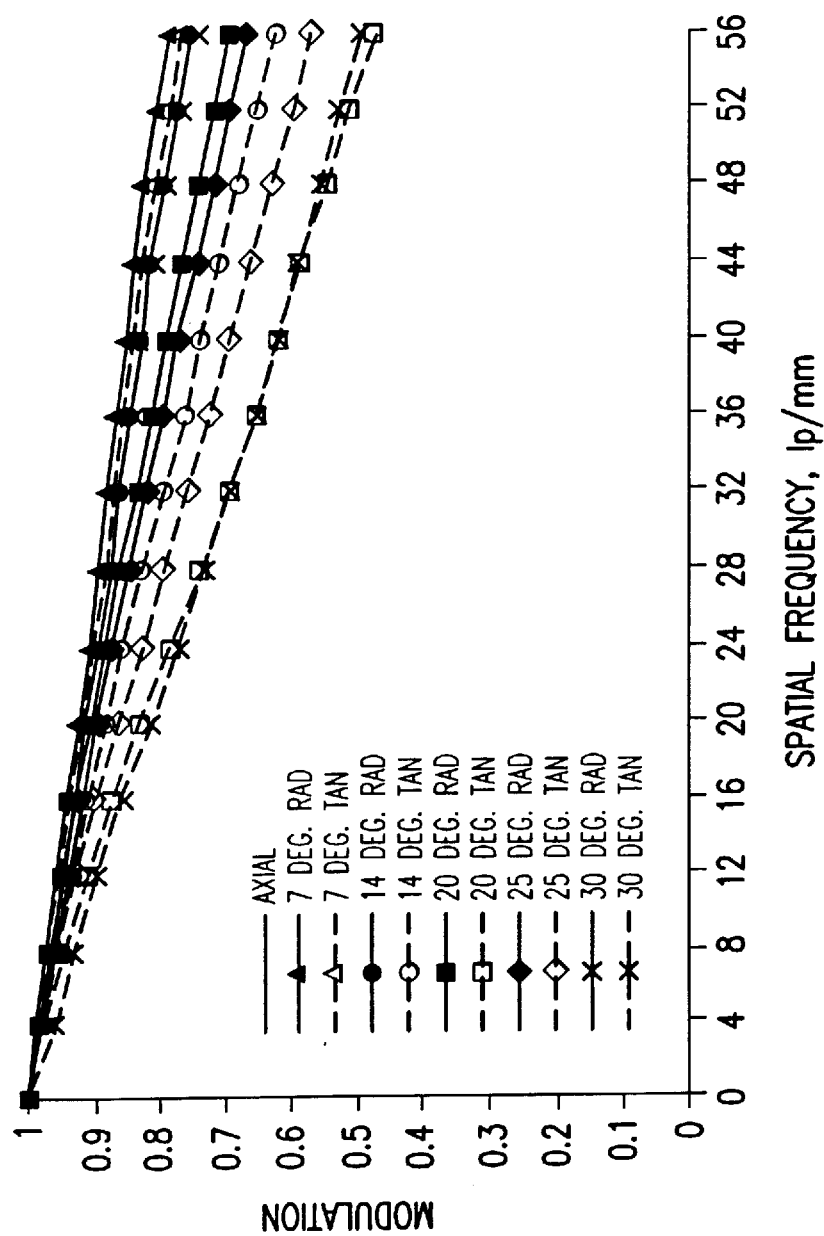
FIG. 3 is a graph of the modulation transfer function for the optical assembly of FIG. 1.

FIG. 3 is a graph of the modulation transfer function (MTF) for the optical assembly of FIG. 1. The MTF, a common measurement of optical resolution, for the intensifier objective optical path. Line 30 represents the theoretical best, diffraction limited MTF. The other lines in FIG. 3 are radial and tangential MTF resolutions at various degree angles as shown. Performance is comparable to the Army's current PVS-4 objective, and provides ample optical resolution (greater than 50% modulation) for intensifier tubes.

While this invention has been described in terms of preferred embodiment consisting of an eyepiece design, those skilled in the art will recognize that the invention can be practiced with modification within the spirit and scope of the appended claims.

Having thus described my invention, what I claim as new and desire to secure by Letters Patent is as follows:

1. An optical eyepiece assembly for providing a sixty degree field of view capability to an image intensifier comprising:

a first air-spaced lens doublet positioned on the optical axis after an aperture stop for accepting incoming light and providing eye relief distance;

a second air-spaced lens doublet positioned after the first air-spaced lens doublet positioned on the optical axis for providing optical magnification;

a first lens positioned after the second air-spaced lens doublet on the optical axis for flattening output from the second air-spaced lens doublet;

a filter element positioned after the first lens on the optical axis for spectrum filtering an output from the first lens;

a second lens positioned after the filter element on the optical axis for flattening output from the filter element which is input through an input substrate of an image intensifier whereby a 60 degree field of view is effected with reduced eye relief distance and increased stop diameter.

* * * * *